March 8, 1960 V. H. BARWOOD 2,927,495
COMPOSITE SELF-SEALING WASHER
Filed Feb. 20, 1957
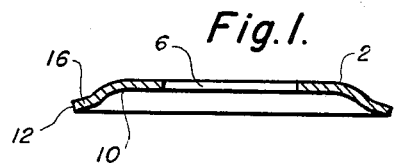
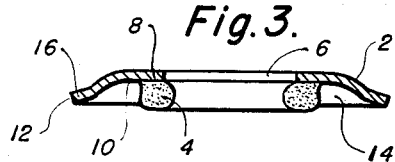
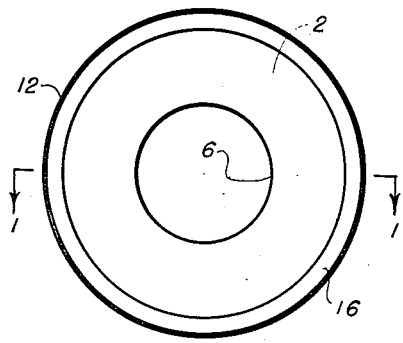
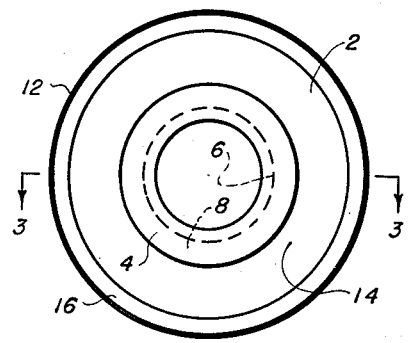
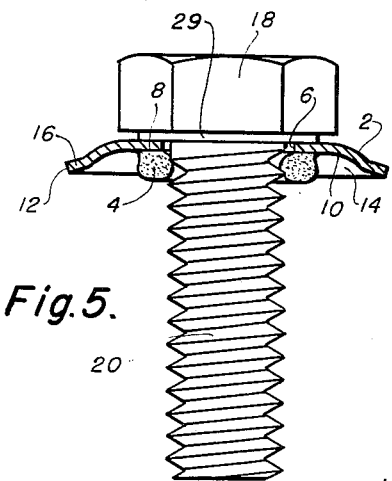
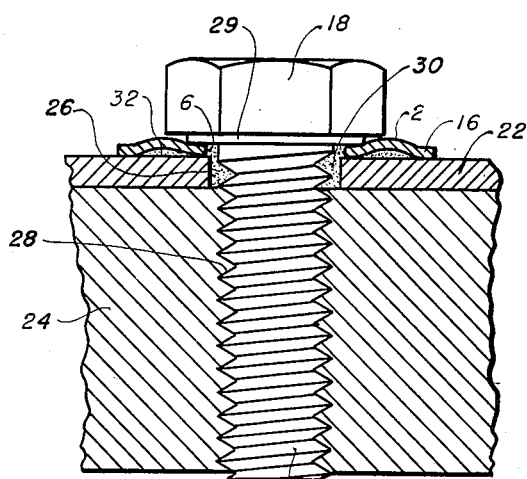
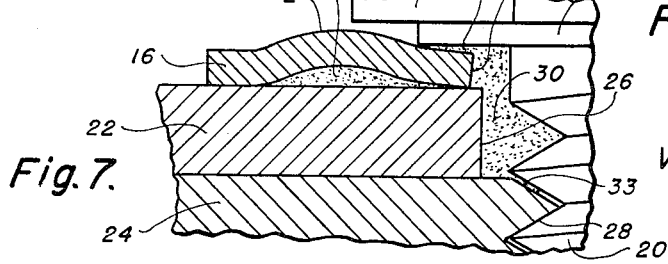
Inventor
Victor H. Barwood
by Rives and Rives
Attorneys ically side by side in a unitary structure, with the opening at the center of the washer. In its preferred form, the ring element of relatively hard material is of concavo-convex or equivalent shape, and the ring element of relatively soft material is positioned along a relatively small region of the inner margin of the washer, adjacent to its opening, in contact with the concave face of the ring element of relatively hard material. The remaining area of this concave face, between the ring element of relatively soft material and the outer margin of the ring element

United States Patent Office 2,927,495
Patented Mar. 8, 1960

2,927,495

COMPOSITE SELF-SEALING WASHER

Victor H. Barwood, Boston, Mass.

Application February 20, 1957, Serial No. 641,381

2 Claims. (Cl. 85—1)

The present invention relates to washers, methods of making the same, joints employing washers, and combined fasteners and washers.

It is common practice to secure a frame to a body by means of bolts, screws and the like, hereinafter referred to as fasteners, that extend through the frame and the body, with a washer interposed between the head of the fastener and the frame. In constructions of this character, there is a tendency for leakage to occur at the areas between the head of the fastener and the washer, between the washer and the surface of the frame against which it engages, and between the shank of the fastener and the adjacently disposed portions of the frame and the body. This is objectionable in certain installations, as, for example, at the joints between a wash-tub body and the wringer-supporting frame that is bolted or screwed thereto. It has accordingly been proposed to provide various means for preventing such leakage.

Leak-proofing of this character has usually been brought about by interposing a soft material, like rubber, plastic or other synthetic or composition product, between the washer, which is usually of metal, and the member upon which the washer is mounted. Upon the fastener becoming securely fastened in place, the soft material becomes put under compression, which results in rendering the joint tight and, in some cases, also leak-proof. The soft material, however, in time, disintegrates, whereupon the joint loosens and loses its leak-proofing characteristics. In warm climates, furthermore, the soft material often liquefies; and, though it later may harden again, upon a fall in temperature, it will never again be in so tight relation to the parts between which it was originally compressed, and the leak-proofing, if it ever existed, exists no longer.

Troubles of a different nature occur under extreme low temperatures. The soft material may then freeze and crack or otherwise fall to pieces, causing the joint again to loosen and leak.

A chief object of the present invention is to provide a new and improved washer that shall render the joint tight and leak-proof, even under conditions of extreme changes in temperature.

With the above object in view, a feature of the present invention resides in a composite washer comprising a ring element constituted of relatively hard material, such as metal, and a ring element constituted of relatively soft material, such as a suitable plastic or other synthetic or composition product, rigidly assembled together concentrically side by side in a unitary structure, with the opening at the center of the washer. In its preferred form, the ring element of relatively hard material is of concavo-convex or equivalent shape, and the ring element of relatively soft material is positioned along a relatively small region of the inner margin of the washer, adjacent to its opening, in contact with the concave face of the ring element of relatively hard material. The remaining area of this concave face, between the ring element of relatively soft material and the outer margin of the ring element of relatively hard material, is free, providing an empty space between the outer margin of the ring element of relatively hard material and the ring element of relatively soft material, for a purpose more fully described hereinafter.

A further object of the invention is to provide a new and improved ring element of metal or other relatively hard material particularly adapted for assembly with suitable relatively soft material to produce the new and improved washer of the present invention.

Another object is to provide a new and improved joint employing a composite washer of the above-described character.

Still another object is to provide a new and improved combination of a bolt, screw or other threaded or serrated fastener, or other fastener having a non-smooth shank, and a washer upon which it is assembled.

Another object still of the invention is to provide a new and improved method of manufacturing composite washers of the above-described character.

Other and further objects of the invention will be described hereinafter and will be particularly pointed out in the appended claims.

The invention will now be more fully described in connection with the accompanying drawings, in which Fig. 1 is a diametrical section, taken upon the line 1—1 of Fig. 2, looking in the direction of the arrows, of a ring element of relatively hard material suitable for assembly with a ring element of relatively soft material in accordance with the present invention; Fig. 2 is an underside plan of the same; Fig. 3 is a section similar to Fig. 1, taken upon the line 3—3 of Fig. 4, looking in the direction of the arrows, of a composite washer constructed according to a preferred embodiment of the present invention; Fig. 4 is an underside plan of the same, similar to Fig. 2; Fig. 5 is an elevation of a combined fastener and washer embodying the present invention, the washer being shown in diametrical section, as in Fig. 3; Fig. 6 is a similar view of a preferred joint embodying the present invention, the frame and the body, like the washer, being shown in section; Fig. 7 is a fragmentary section of a detail, upon a larger scale, of the joint shown in Fig. 6.

In its preferred form, the composite washer of the present invention is shown in Figs. 3 and 4 as comprising a ring element 2 constituted of relatively hard material, and a ring element 4, constituted of relatively soft, resilient or yielding material, permanently assembled together concentrically side by side in a unitary structure with the opening 6 at the center of the washer. The washer is thus capable of manipulation as a unit. The ring element 2, of relatively hard material, may be constituted of metal, and the ring element 4, of relatively soft material, may be constituted of a suitable plastic or other synthetic or composition product. The nature of the relatively hard and relatively soft materials may depend upon the use to which the washer may be put. If the washer is to be used in the construction of acid-containing tanks, for example, the composition should be acid-resistant. For brevity, however, and to avoid circumlocution of language, the relatively hard material will hereinafter be referred to as metal, and the relatively soft material as composition.

In Figs. 1 to 5, inclusive, the metal ring element 2 is shown concavo-convex. This term will be employed herein, again in the interest of brevity, to include also equivalent shapes, such as conical, arch, cup-shaped and the like. In Figs. 3, 4, 5 the composition ring element 4 is shown positioned along a relatively small annular region 8 of the inner margin of the metal ring element 2, along the opening 6 of the washer, in contact with the concave face 10 of the metal ring element 2. This small annular region 8 may be referred to, for definiteness, as the crown of the metal ring element 2. The remaining area of the said concave face 10, between the composition ring element 4 and the outer peripheral margin 12 of the metal ring element 2, is shown free to provide an empty annular space 14 between the outer peripheral margin 12 and the composition ring element 4. The metal ring element 2 is shown provided with an outer peripheral flange 16 projecting outward in a direction away from the opening 6 of the washer, and terminating in the outer peripheral margin 12.

In Figs. 6 and 7, the novel washer of the present invention is shown positioned between the head 18 of a screw 20 and a frame 22. The screw 20 is shown holding the frame 22 to a body 24. As before suggested, for example, the body 24 may be a wash tub, and the frame 22 may be a wringer support. The screw 20 may, of course, be replaced by a bolt, that may hold the frame 22 to the body 24 by means of a nut, not shown, or it may represent any other desired fastener. For reasons that will appear more fully hereinafter, the fastener is preferably threaded, but the washer of the present invention may be used also with unthreaded headed fasteners, such as nails provided with partly or wholly serrated or even smooth shanks. In all cases, the joint between the fastener 20, the frame 22 and the body 24, produced as hereinafter described, will be tight and leak-proof.

The reasons why the joint will be tight and leak proof will be better understood, once an understanding is obtained of the operation that takes place during the assembly of the fastener 20 and the washer of the present invention with the frame 22 and the body 24.

Referring again to Figs. 6 and 7, the screw 20 is shown therein positioned in alined openings 26 and 28 of the frame 22 and the body 24, with the washer of the present invention interposed between the head 18 of the screw 20 and the frame 22. In the illustrated construction, the opening 26 of the frame 22 is shown unthreaded, and the opening 28 of the body 24 is shown threaded, with its threads engaged by the threads of the screw 20. If the fastener 20 were a bolt, instead of a screw, however, the alined openings 26 and 28 of the frame 22 and the body 24 would both be unthreaded, and the parts would be secured in place by means of a nut threaded on the bolt 20. It is within the scope of the present invention, moreover, to employ the novel washer with screws of the self-tapping variety, without any previous opening 26 or 28 or both, or with such openings of smaller diameter than as illustrated. The same tight and leak-proofing effect, presently to be described, would occur, furthermore, even if the fasteners 20 were unthreaded, as in the case of a nail, part or all of the shank of which may be serrated or even smooth. The important consideration is as to what happens when the fastener 20 is driven home, to secure the frame 22 and the body 24 together, with the washer of the present invention interposed between the head 18 of the fastener 20 and the frame 22.

With many composite washers of the prior art, during the driving home of the fastener, the composition part of the washer engages against the frame 22, and becomes crushed, before the metal part of the washer is afforded an opportunity even to come into engagement with the frame 22. By far the greater part of the composition material, therefore, flows away and becomes dispersed before it can be secured in place at positions where it could serve to render the joint satisfactory, either from the point of view of tightness or leak-proofing.

According to the present invention, on the other hand, the outer peripheral flange 16 engages the frame 22 before the composition ring element 4 becomes crushed, and while it is still substantially intact, and confined within the annular space 14. The peripheral flange 16 forms a flat annular band in contact with the underlying part of the joint and so prevents the escape of any of the sealing compound and insures that it shall be forced into the interstices of the joint. It thus becomes possible to utilize all the material of the composition ring element 4 most effectively, for rendering the joint tight and leak-proof. How this result is attained will now be described.

During the driving home of the fastener 20, a circumferential shoulder 29 on the underside of its head 18 first engages the crown 8 of the metal ring element 2. Since this occurs at a time when the outer peripheral flange 16 is in engagement with the frame 22, the composition ring element 4 remtains, at this time, substantially uncrushed, or even substantially undistorted. As the fastener 20 continues to be driven home, the crown 8 of the metal ring element 2 becomes bent inward by the circumferential shoulder 29, toward the frame 22, along a small circular area near the opening 6 of the washer. As clearly shown in Figs. 6 and 7, the crown 8, along the margin of the opening 6 of the washer, becomes finally actuated into contact with the frame 22. The shape of the crown 8, at this time, is not always precisely as illustrated in Figs. 6 and 7. At times, the crown 8 even overlaps into the opening 26 of the frame 22.

What is of importance is that since the circumferential shoulder 29 of the head 18 of the fastener 20 is of smaller diameter than the diameter of the metal ring element 2, as illustrated, it never engages the outer circumferential portions of the metal ring element 2. These outer circumferential portions, therefore, though becoming somewhat deformed, nevertheless still retain something of their concavo-convex shape, and a portion of the before-described annular space 14 still remains above the frame 22, between the outer margin 12 of the metal ring element 2 and the composition ring element 4. The said annular space 14, though somewhat reduced in volume, is therefore nevertheless still present in the final structure, after the parts have been assembled together, as illustraed by Figs. 6 and 7.

Since, during the final driving home of the fastener 20, however, the crown 8, as before described, has been forced into engagement with the frame 22, it has penetrated into the soft material of the composition ring element 4. The composition material has been prevented from flowing away, or becoming dispersed, however, by the confining action of the outer peripheral flange 16 of the metal ring element 2. The thus confined material of the composition ring element 4, however, has become divided into three, four or even five ring parts.

A first ring part of the composition has become wedged into the space between the walls of the openings 26 of the frame 22 and the shank of the fastener 20, as shown at 30. A second ring part which, however, may be continuous with the ring part 30, has become wedged between the head 18 of the fastener and the washer, underneath the circumferential shoulder 29. This is not very clearly shown in Fig. 6, because of the small scale, but it is clearly shown at 31 in Fig. 7. A third ring part, which is of larger diameter than the diameters of the ring parts 30 and 31, has become wedged into the before-described reduced annular space 14, as shown at 32, within the outer peripheral flange 16.

A fourth ring part will be formed between the shank of the screw 20 and the opening 28 of the body 24. If the screw 20 is replaced by a bolt, and the opening 28 is smooth, as above described, this fourth ring part may be of substantial thickness. Even if the opening 28 is threaded, as shown, however, this fourth ring part will also form, though it may be very thin. It will form at the upper part of the opening 28, between the uppermost thread thereof and the adjacently disposed thread of the shank of the screw 20, as shown in Fig. 7 at 33. It is not shown in Fig. 6 because of the small scale. This fourth ring part is usually smaller than the circumference of the shank of the screw 20.

In all cases, however, the composition material of the ring element 4 remains in the places where it should remain, at 30, 31, 32 and 33, to provide a very tight leak-proof joint. This is because, as before explained, the metal body element 2 is caused to engage the frame 22, so as to confine the composition element 4, before the latter can become crushed, distorted or dispersed. Leakage is thus prevented at all sensitive areas: at the areas between the circumferential shoulder 29 of the head 18 of the fastener 20 and the washer, as shown at 31; between the washer and the adjacently disposed surface of the frame 22 against which it engages, as shown at 32; and between the shank of the fastener 20 and the adjacently disposed walls of the openings 26 and 28 of the frame 22 and the body 24, as shown at 30 and 33. Conditions of extreme heat or cold, furthermore, do not affect either the tightness of the joint or its leak-proof qualities. They can not affect the tightness of the joint because that tightness is provided through the outer peripheral flange 16 of the metal ring contacting against the metal of the frame 22 upon which the washer is mounted, and not through the resiliency of a soft member interposed between them. The leak-proof qualities are not affected because, even though the separate rings 30, 31, 32 and 33 of soft composition material may soften, under extreme heat, or become affected by conditions of extreme cold, they still remain in the same positions that they occupied prior to the occurrence of the extremes of heat or cold and, therefore, they will still prevent leakage past the joint.

It has been stated, for example, that the body 24 may be the wall of a wash-tub, and the frame 22 may be a wringer-supporting frame. In wash-tubs of this character, it is customary to secure the wringer-supporting frame 22 to the wash-tub body wall 24 by means of two bolts, employing two washers. The heads of the bolts are positioned inside the wash-tub, and nuts are tightened on the outside. The heads of the bolts and the washers through which the bolts extend are thus constantly disposed in the washing fluids. It is impossible for any of these fluids, however, to leak out toward the joints provided by the washer of the present invention, because these joints are leak-proof at all areas that might otherwise leak.

The washer of the present invention, moreover, is relatively very inexpensive, because of the small amount of composition employed in the composition ring 4, compared to the relatively large amount that has been employed heretofore in composite washers of this character. A very much more efficient leak-proofing effect is produced, notwithstanding this smaller amount of composition contained in the composition ring 4.

In Figs. 3 and 4, the opening of the composition ring element 4 is shown of smaller diameter than that of the opening of the metal ring element 2. This tends to increase the above-described effect of wedging the composition material into the spaces between the shank of the fastener 20 and the walls of the openings 26 and 28 of the frame 22 and the body 24, as illustrated in Figs. 6 and 7 at 30 and 33, and between the circumferential shoulder 29 and the washer, as illustrated at 31. There is another advantage arising out of this smaller diameter that will now be described.

There is no great difficulty about assembling a threaded fastener with a washer made of non-metal resilient or yielding material. All that is necessary is to push the shank of the threaded fastener through the opening of the non-metal washer. The non-metal material yields, permitting of such assembly, and then recovers its shape, whereupon it is held on the shank of the fastener by friction.

All that is necessary is relatively so to move the fastener 20 and the washer in such a way that the shank of the fastener 20 shall enter the opening 6 of the washer, downward, as viewed in Fig. 3. The composition of the composition washer 4 yields easily, in this direction downward, away from the metal ring element 2, to permit this, resulting in the product illustrated by Fig. 5. It is not necessary, therefore, to slit or otherwise render the washer resilient, because the composition material of the composition ring element 4 is sufficiently resilient or yielding to start out with, in the said direction downward, away from the metal ring element 2, despite the fact that the diameter of the opening of the composition ring element 4 is smaller than that of the threaded shank of the fastener 20. And it is also not necessary to assemble the fastener 20 and the washer of the present invention prior to threading the fastener 20. It is not so easy, however, to remove the washer from the fastener after the parts have been so assembled, as shown in Fig. 5. Any such effort to remove the washer is resisted by the composition material of the composition ring element 4 binding against the crown 8 of the metal washer; and the greater the effort, the greater is this resistance. It is only with considerable difficulty, therefore, that the washer of the present invention can be removed from the fastener 20, once it has been assembled therewith, as illustrated in Fig. 5. The crown 8 of the metal ring element 2 therefore holds the composition of the composition ring element 4 firmly enough against the threads of the fastener 20 to prevent disassembly of the fastener 20 and the washer of the present invention for all practical purposes.

The preferred composition may be a rubber-like material comprising an intimate mixture or dispersion of a vinyl resin in a liquid plasticizer which will be a non-volatile liquid plasticizer. The vinyl resin may be of a vinyl chloride or poly-vinyl chloride and is present usually in a dispersed phase in the non-volatile liquid plasticizer and which will remain in this state at room temperatures and will be of a viscous or thick nature so that it will remain in the same position and the same shape after lining and curing. Due to the fact that the plasticizers are non-volatile, there is no shrinkage as drying occurs. A suitable such composition is described in Letters Patent of the United States 2,732,031, in the names of Milton Rabbitt, Gregory, and Carl F. Binder, assignors to Fram Corporation, a corporation of Rhode Island, and is marketed by Dewey & Almy Chemical Co., Cambridge, Massachusetts.

This composition is acid-resistant. The invention is not, however, limited to use with this precise compound. Other plastisol compounds, for example, comprising paste dispersions of synthetic elastomers in plasticifiers, together with fillers, pigments and stabilizers having the above-described properties may also be employed.

Modifications may be made by persons skilled in the art, and all such are considered to fall within the spirit and scope of the invention, as defined in the appended claims.

What is claimed is:

1. The combination of a headed shank fastener, a composite washer and a member, the shank being inserted into said member with the composite washer seating on said member, said composite washer comprising a circular body of bendable metal having an aperture therein accommodating the shank of the fastener, and a ring of flowable relatively soft plastic material bonded to the underside of the body, said plastic material being of sufficient volume to form a leak-proof seal between the shank of the fastener, shank head, washer and member, said circular body having a compressible dome and a flat peripheral flange located outwardly from the aperture and seating on said member, said plastic ring being confined to a small annular region adjacent said aperture before pressure is applied thereto to leave an empty space between said peripheral flange and said plastic ring, said plastic ring having an aperture, the shank of said fastener extending through the apertures in said composite washer, the aperture in said plastic ring having a smaller diameter than the diameter of the aperture in said circular body and the diameter of said shank before pressure is applied to said plastic ring, the head of said fastener engaging the top of said composite washer and the shank of the fastener passing with clearance through the aperture of the body, the head of said fastener exerting pressure on the dome of said circular body only adjacent its aperture thereby deforming the dome adjacent the aperture and exerting pressure on said plastic ring causing the plastic ring to flow outwardly toward and into contact with the peripheral flange of said circular body and form an annular ring between said member and the underside of said circular body, inwardly and downwardly into sealing engagement between said shank and said member, and upwardly between the top of the deformed portion of said circular body and bottom of the head of said fastener to provide a leak-proof seal between the shank head of the fastener, washer and member while the flat peripheral flange of the metal body prevents escape of the plastic sealing material when the dome is compressed by the head of said fastener.

2. The combination of a headed shank fastener and a composite washer, the shank being adapted to be inserted into a member with the composite washer seating on the member, said composite washer comprising a circular body of relatively hard bendable material having an aperture therein for accommodating the shank of the fastener, and a ring of flowable relatively soft plastic material bonded to the underside of the body, said plastic material being of sufficient volume to form a leak-proof seal between the shank of the fastener, shank head, washer and the member, said circular body having a compressible dome and a flat peripheral flange located outwardly from the aperture and being adapted to seat on the member, said plastic ring being confined to a small annular region adjacent said aperture before pressure is applied thereto to leave an empty space between said peripheral flange and said plastic ring, said plastic ring having an aperture, the shank of said fastener extending through the apertures in said composite washer, the aperture in said plastic ring having a smaller diameter than the diameter of of the aperture in said circular body and the diameter of said shank before pressure is applied to said plastic ring, the head of said fastener being adapted to engage the top of said composite washer and the shank of the fastener passing with clearance through the aperture of the body, the head of said fastener being adapted to exert pressure on the dome of said circular body only adjacent its aperture to deform the dome adjacent the aperture and exert pressure on said plastic ring and cause the plastic ring to flow outwardly toward and into contact with the peripheral flange of said circular body and form an annular ring between the member and the underside of said circular body, inwardly and downwardly into sealing engagement between said shank and the member, and upwardly between the top of the deformed portion of said circular body and bottom of the head of said fastener to provide a leak-proof seal between the shank head of the fastener, washer and member while the flat peripheral flange of the circular body prevents escape of the plastic sealing material when the dome is compressed by the head of said fastener.

References Cited in the file of this patent

UNITED STATES PATENTS

| 1,814,502 | Barwood | July 14, 1931 |
| 2,718,691 | Sussenbach | Sept. 27, 1955 |
| 2,732,031 | Rabbitt et al. | Jan. 24, 1956 |
| 2,761,347 | McKee | Sept. 4, 1956 |

FOREIGN PATENTS

| 318,277 | Germany | Jan. 16, 1920 |
| 849,343 | France | Aug. 11, 1939 |